United States Patent [19]
Eskes et al.

[11] Patent Number: 5,458,772
[45] Date of Patent: Oct. 17, 1995

[54] ADJUSTABLE FILTER HOLDER ASSEMBLY

[75] Inventors: Don H. Eskes, Fresno, Calif.; Richard A. Bernard, Kirkland; Sidney A. Burklund, Bothell, both of Wash.

[73] Assignee: Filtercorp Partners L.P., Woodinville, Wash.

[21] Appl. No.: 181,018

[22] Filed: Jan. 13, 1994

[51] Int. Cl.⁶ .................................................. B01D 35/00
[52] U.S. Cl. ................... 210/238; 210/232; 210/416.5; 210/445; 210/473; 55/511; 55/DIG. 31; 99/360
[58] Field of Search .................................. 210/232, 238, 210/416.5, 445, 473, DIG. 8; 55/DIG. 31, 511; 99/360

[56] References Cited

U.S. PATENT DOCUMENTS 4,043,916  8/1977  Wecker, Sr. ............................ 210/238
4,959,144  9/1990  Bernard et al. ........................ 210/232
5,143,604  9/1992  Bernard et al. .................... 55/DIG. 31

*Primary Examiner*—Robert A. Dawson
*Assistant Examiner*—David Reifsnyder
*Attorney, Agent, or Firm*—Christensen, O'Connor, Johnson & Kindness

[57] ABSTRACT

A filter holder assembly for use with an oil filtering pan in a food fryer filtration system to filter a contaminated cooking oil is provided with an adjustable sealing ring so as to accommodate filters of different thicknesses such as filter pads and filter paper. In one self-adjusting embodiment, the sealing ring is configured for vertical movement by way of a pair of pins operatively connected to the sealing ring and that are movable vertically within a corresponding pair of slotted hinge members. When a filter pad is used with this embodiment, the pins are urged against the hinge members such that pressure is applied to the sealing ring to form a positive seal. Alternative embodiments create a positive seal when either a filter pad or filter paper is used.

14 Claims, 5 Drawing Sheets

ADJUSTABLE FILTER HOLDER ASSEMBLY

FIELD OF THE INVENTION

The present invention relates to a filter holder assembly, and more particularly to an adjustable filter holder assembly for use with a fluid filtration system and capable of being used with filters of different thicknesses, such as filter pads and filter paper, depending upon the preference of the user.

BACKGROUND OF THE INVENTION

Cooking oils, such as those used in commercial or institutional deep fryers, tend to become contaminated with things such as moisture and carbonized food particles during frying. Also, the oils also tend to break down chemically after extended use, often causing the oil to foam or smoke or to exhibit an unpleasant odor, poor appearance, or unsatisfactory taste. It has been found that keeping the cooking oil clean by filtering it on a regular basis to remove the particulate matter tends to extend the useful life of the cooking oil and increase the quality and appearance of foods cooked in the oil.

Accordingly, a variety of specialized systems and filter media for filtering cooking oil have been developed. In one widely used type of filtration system, contaminated oil is transferred from the deep fryer to an oil filtering pan. The oil is caused to flow through a filter and then drained out of the filtering pan and returned to the deep fryer. Two of the most commonly used filtering media are filter pads and filter paper. As compared to filter pads, filter paper is relatively thin and tends to remove particulate matter less effectively and to have a shorter useful life. Nonetheless, it has been observed that within the same facility, while some personnel prefer to use filter pads, others prefer to use filter paper. Thus, a filtration system ideally should be amenable to use with both filter pads and filter paper.

A problem with existing filtration systems is that either: (1) they are able to be used with only a single filter media, that is, either filter pads or filter paper, but not both; or (2) although usable with both filter pads and filter paper, less effective filtering is achieved because only a "non-positive" seal is obtained. As to this second point, it has been found that when a non-positive seal is formed, there is a tendency for some oil to flow around the filter rather than through the filter, thereby allowing unfiltered contaminated oil to be returned to the deep fryer. An example of an oil filtering pan which provides only a non-positive seal is discussed directly below.

It is known to secure a filter, whether pad or paper, within an oil filtering pan by placing a weight ring on top of the filter to compress the filter around the periphery thereof to form a seal. The seal is sometimes unsatisfactory in that oil is permitted to flow around the filter rather than through the filter, thereby allowing unfiltered contaminated oil to be returned to the deep fryer. This flow of oil around the filter is believed to occur because only the weight of the weight ring itself is applied to the filter, thereby forming a "non-positive" seal. A configuration that yields a "positive" seal (i.e., that applies additional pressure other than by virtue of the weight of the member(s) overlying the filter, i.e., the weight ring) is desirable to more effectively prevent the flow of oil around, rather than through, the filter.

Another type of known oil filtering pan includes a support surface on which a filter is placed so as to overlie an opening in the bottom of the pan for the passage of filtered oil. A sealing ring is connected at one side of the support surface for pivotal movement between: (1) a sealing position in which the sealing ring compresses the filter against the support surface; and (2) an access position in which the sealing ring is swung outwardly away from the filter compartment so that a filter may be installed or removed. A disadvantage of this type of oil filtering pan is that it is usable only with filter pads since the configuration of the sealing ring does not allow for the use of filter paper. Specifically, the sealing ring is provided with a pair of arms, each carrying a horizontal pin. A pair of hinge members is provided adjacent one edge of the substantially rectangular filter compartment. Each hinge member has an opening therethrough for engagement of a corresponding one of the pins on the weight ring. The sealing position of the sealing ring is fixed because the distance between the filter support surface and the bottom of the sealing ring is constant. This filtering assembly is not amenable for use with filter paper because the sealing ring in its sealing position lies above the filter paper and is not capable of being positioned so as to compress the filter paper to form a seal.

In summary, there exists an oil filtering pan usable with both filter pads and filter paper. However, this pan achieves only a non-positive seal around the filter thereby providing less effective removal of particulate matter and allowing unfiltered contaminated oil to be returned to the deep flyer. Also, it is known to urge a sealing ring downwardly against a filter so as to create a positive seal around the filter. However, this type of filter holder assembly can accommodate only one type of filter media, i.e., filter pads.

A convenient oil filtering pan that is usable with both filter pads and filter paper and that provides more effective removal of particulate matter from contaminated oil is desirable.

SUMMARY OF THE INVENTION

The present invention is a convenient filter holder assembly usable with either a filter pad or filter paper and having a simple construction. In one embodiment, users may switch between filter pads and filter paper without making any adjustment to the device. Moreover, a positive seal is obtained when a filter pad is used. Alternative embodiments are provided in which a positive seal is created when either a filter pad or filter paper is used, some of which require the user to make a minor adjustment to the device. All embodiments of the present invention provide advantages lacking in known filter holder assemblies. The adjustable filter holder assembly of the present invention is discussed herein as an integral part of an oil filtering pan. However, it should be understood that the filter holder assembly may be formed as a discrete unit to be incorporated in a filtering pan.

In one embodiment, the filter holder assembly is used with an oil filtering pan comprising a receptacle for holding oil, the receptacle having an opening at the bottom thereof for the passage of filtered oil and a filter support surface situated above the opening. A sealing ring having a filter contact surface is configured so that the filter support surface of the receptacle and the filter contact surface of the sealing ring define a compartment for receipt of a filter when the sealing ring is in the sealing position. The filter contact surface of the sealing ring is movable vertically so that the distance between the filter support surface of the receptacle and the filter contact surface of the sealing ring may be adjusted to accommodate filters of different thicknesses, e.g., both pads and paper. In a preferred embodiment, a pair of vertically extending hinge members are located by the filter support surface. Each of the hinge members includes a substantially vertical slot. The sealing ring includes a pair of arms, each carrying a horizontal pin. To attach the sealing ring within the oil filtering pan, each of the pins is inserted in a corresponding one of the vertical slots in the hinge members. The pins are movable upwardly and downwardly within the slots so that the sealing ring is free to move up and down to accommodate filters of different thicknesses. Preferably, when the oil filtering pan is used with a filter pad, the sealing ring, in its sealing position, is raised by the thickness of the pad such that the pins are urged against the tops of the slots in the hinge members, thereby resulting in the application of pressure against the sealing ring so as to form a positive seal. This configuration is self-adjusting in that it is also amenable for use with filter paper without requiting any adjustment by the user.

In an alternative embodiment, each hinge member is provided with two or more openings located at varying heights. The openings may be interconnected or discrete. By placing the sealing ring pins in the appropriate openings, a user can designate a height for the sealing ring and thus define a filter compartment capable of accommodating a filter of a desired thickness. Preferably the assembly is dimensioned so that a positive seal is formed regardless of which filter media is selected.

It is foreseen that various configurations may be devised for enabling the adjustment of the sealing ring to accommodate filters of different thicknesses. The preferred embodiments described herein are meant only to be illustrative and should not be interpreted as limiting the claims set forth herein.

BRIEF DESCRIPTION OF THE DRAWINGS

The present invention will be described with reference to the accompanying drawings, wherein.

DETAILED DESCRIPTION OF THE PREFERRED EMBODIMENTS

The present invention is an adjustable filter holder assembly amenable for use with filters of different thicknesses. Although the present invention is described in connection with an oil filtering pan used in conjunction with an oil filtration system for filtering contaminated cooking oil, it should be understood that the filter holder assembly of the present invention is not limited to such use but may be used in other applications.

Figure 1:
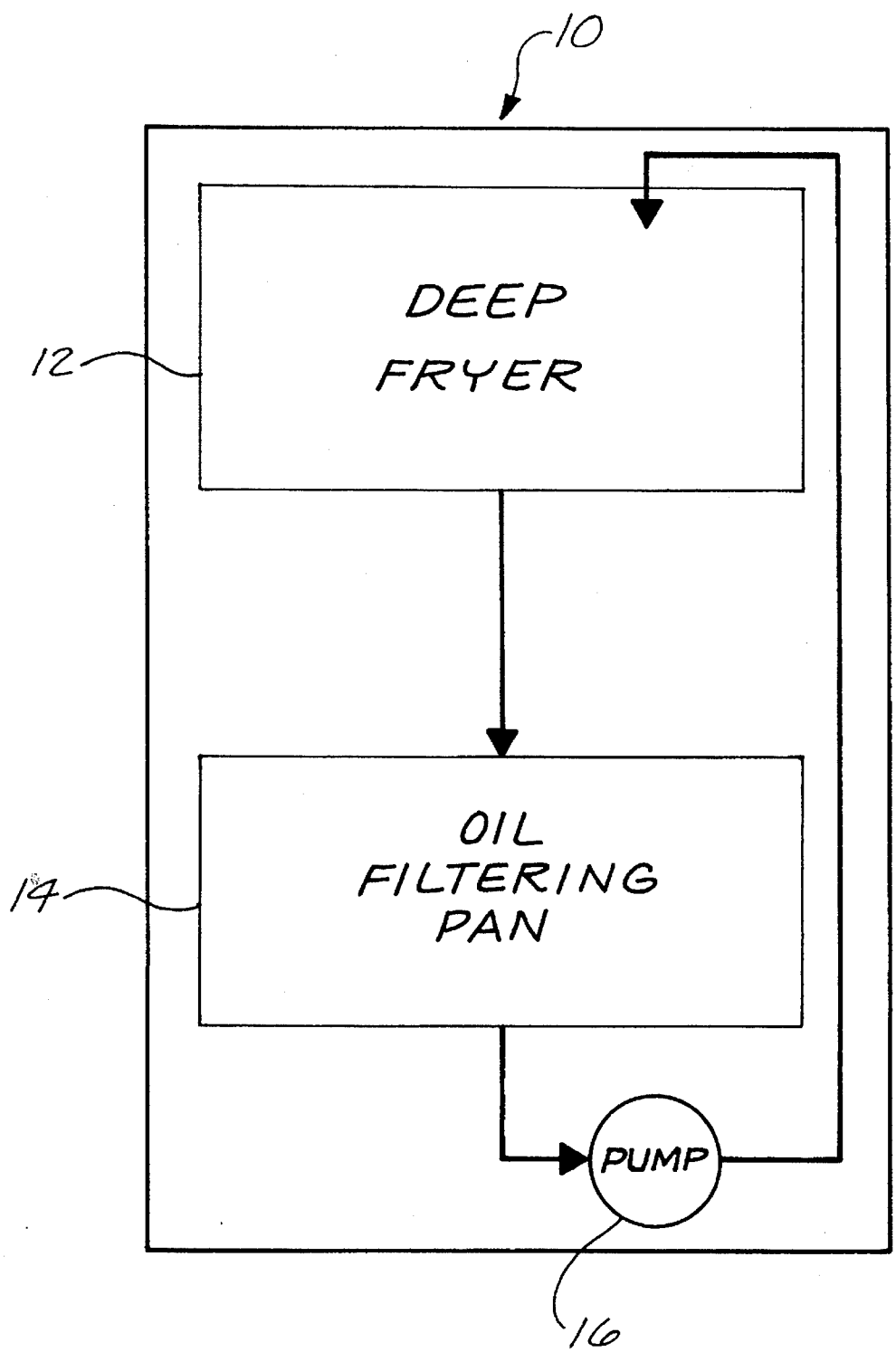
FIG. 1 a schematic view of an oil filtering pan incorporating a filter holder assembly according to the present invention in use with an oil filtration system for a deep fryer.

As shown schematically in FIG. 1, a deep fryer/oil filtration system 10 includes a deep fryer 12 from which contaminated cooking oil is transferred to an oil filtering pan 14. The filtered oil is drained from the oil filtering pan 14 and returned by way of a pump 16 to the deep fryer 12.

Figure 2:
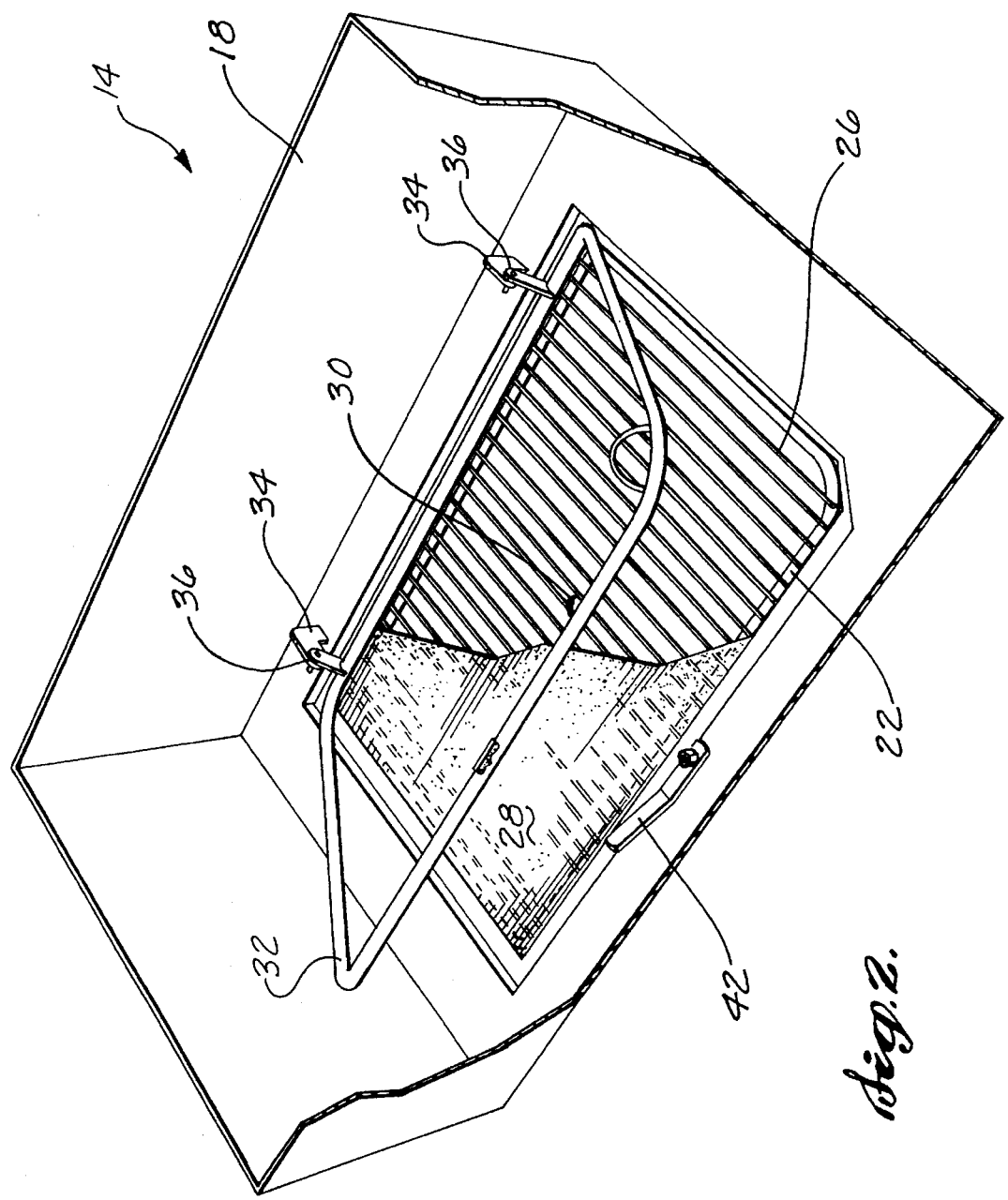
FIG. 2 is a perspective view of an oil filtering pan incorporating a filter holder assembly according to the present invention, with a filter being placed in the pan and the sealing ring being in an access position.
Figure 4:
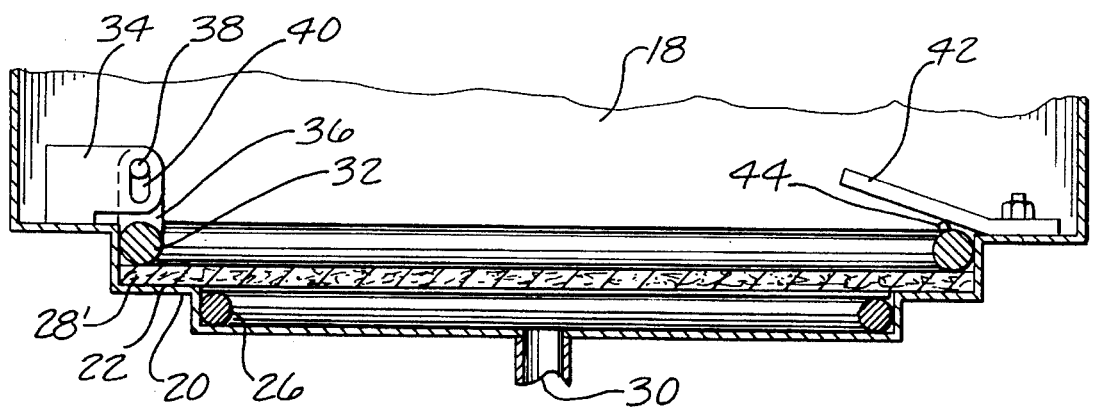
FIG. 4 is a side cut-away view of an oil filtering pan incorporating the filter holder assembly and being used with a filter pad and having the sealing ring in the sealing position.
Figure 5:
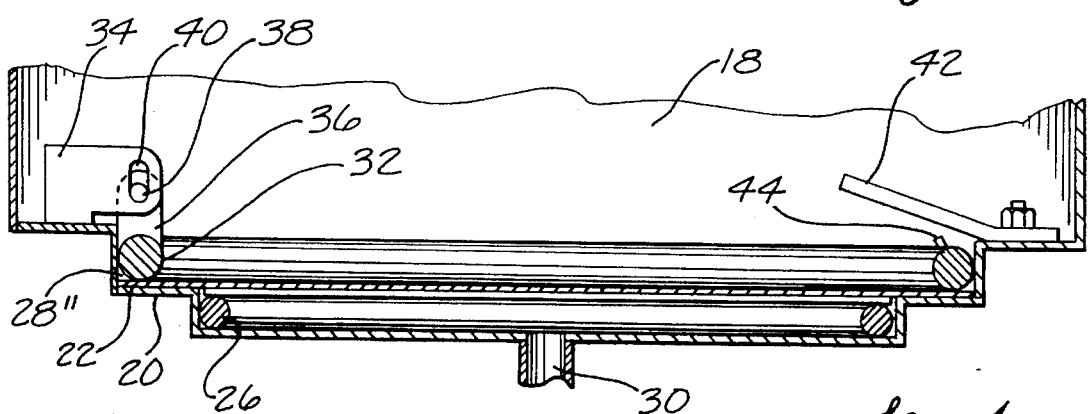
FIG. 5 is a side cut-away view of an oil filtering pan incorporating the filter holder assembly and being used with a filter paper and having the sealing ring in the sealing position.

The present invention is a filter holder assembly usable with filters of all thicknesses, i.e., both filter pads and filter paper of any thickness. Filter pads typically have a thickness in the range of $1/16$ to $1/2$ inch, while filter paper is much thinner, typically having thickness in the range of $1/64$ to $1/16$ inch. FIG. 2 shows an oil filtering pan 14 in which a filter holder assembly in accordance with the present invention has been incorporated as an integral part. However, it should be understood that the filter holder assembly may be formed as a discrete unit to be incorporated in an oil filtering pan. As best seen in FIGS. 2, 4, and 5, the oil filtering pan 14 includes a receptacle 18 for receiving contaminated oil to be filtered. The oil filtering pan 14 may be made, for example, from sheet metal stock and may be formed in any shape, e.g., round, rectangular, etc. In the preferred embodiment, the oil filtering pan 14 has a two-tiered recess formed at the bottom thereof (best viewed in FIGS. 4 and 5). One tier of the recess is defined by a filter support member 20 having a filter support surface 22 generally in the form of a frame. A filter 28 having a perimeter dimensioned substantially the same as the outer perimeter of the filter support surface 22 is seated on that surface. In the bottommost part of the recess is placed an auxiliary filter support 26. Preferably, the auxiliary filter support 26 is a metal grate formed by a series of parallel bars. The auxiliary filter support 26 may assume other forms, e.g., an expanded diamond matrix, so long as the auxiliary filter support 26 provides a support surface for the filter 28 and allows the free flow of contaminated oil through the filter 28 for passage through an opening 30 in the bottom of the oil filtering pan 14.

A sealing ring 32 is configured for movement between: (1) a sealing position in which the sealing ring 32 compresses the filter 28 against the filter support surface 22 so as to prevent contaminated oil from flowing around the filter 28 rather than through the filter 28; and (2) an access position in which the sealing ring 32 is swung outwardly so that a filter 28 may be installed or removed. The sealing ring 32 may be made, for example, from metal rod stock formed into any shape, e.g., a rectangle or a circle. In the embodiment shown in FIGS. 2–5, the sealing ring 32 is connected to the oil filtering pan 14 by way of a pair of hinge members 34 situated at one side of the recess. The hinge members 34 may be formed, for example, from metal plate stock The sealing member 32 is provided with a pair of arms 36 at the top surface thereof on one of the long sides of the rectangularly-shaped sealing ring 32. The arms 36 may be attached to the sealing ring by, for example, welding or brag, and may be formed, for example, from metal plate stock. Each arm 36 carries an engaging member in the form of a horizontal pin 38.

Figure 3:
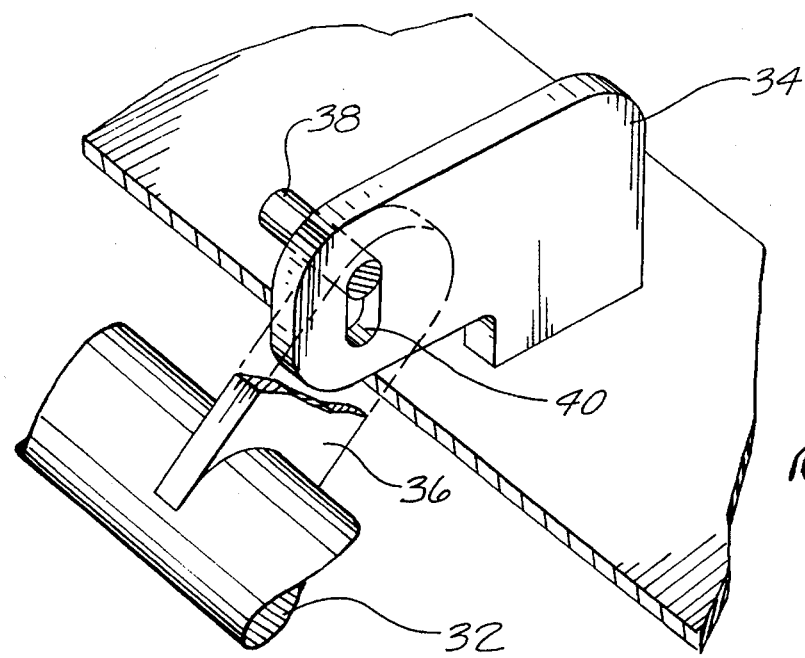
FIG. 3 is a perspective view of one preferred embodiment of the engagement of the hinge member and the sealing ring arm.

As best seen in FIG. 3, each hinge member 34 has a vertical slot 40 formed therein that receives a corresponding one of the horizontal pins 38 (referred to also as "sealing ring pins 38") on the arms 36 of the sealing ring 32. Since the sealing ring pins 38 are movable along the height of the slots 40, the sealing ring 32 is movable between an uppermost position in which the pins 38 are located at the top of the slots 40 (FIG. 4) to a lowermost position in which the pins 38 are located at the bottom of the slots 40 (FIG. 5). As illustrated in FIGS. 4 and 5, the oil filtering pan 14 is configured such that when the sealing ring 32 is in the uppermost position, the bottom of the sealing ring 32 and the filter support surface 22 form a compartment for receipt of a filter pad 28'. In this configuration, the sealing ring pins 38 are urged against the tops of the slots 40 so that positive pressure is applied to the sealing ring 32 so as to compress the filter pad 28' to thereby form a positive seal. One suitable filter pad is commercially sold under the trademark SUPER-SORB by Filtercorp Panners, L. P. of Woodinville, Wash. Further, a rotatable latch 42 is configured to contact a raised area 44 on the opposing long side of the sealing ring 32 so as to compress the filter pad 28' at that side. Similar latches and corresponding raised areas may be provided at other locations along the sealing ring as desired.

As shown in FIG. 5, when the sealing ring 32 is in the lowermost position, the bottom of the sealing ring 32 and the filter support surface 22 form a compartment for receipt of a piece of filter paper 28". In this position, only the weight of the sealing ring 32 compresses the filter paper 28" such that a non-positive seal is formed. However, the configuration illustrated in FIGS. 3–5 is advantageous in that it is self-adjusting, i.e., users do not have to make any adjustment when switching between the use of filter pads and filter paper.

Figure 6:
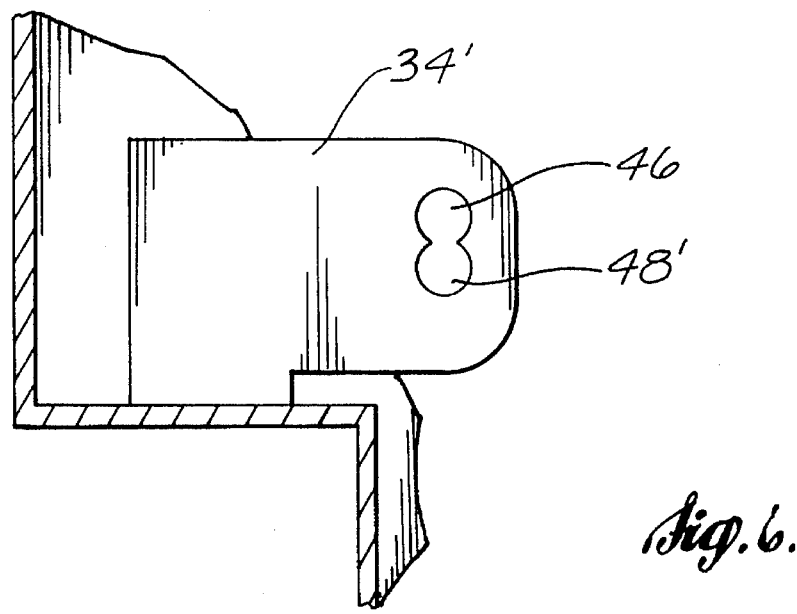
FIG. 6 is a side view of an alternative embodiment of the hinge member.
Figure 8:
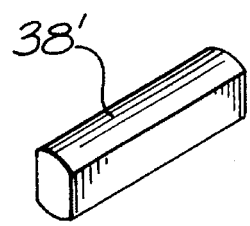
FIG. 8 is a perspective view of an alternative embodiment of the engaging member carried by the sealing ring arm.

An alternative embodiment is illustrated in FIG. 6, in which hinge member 34' is provided with two vertically-oriented interconnected openings, the uppermost opening 46 corresponding to a raised position in which the sealing ring 32 accommodates a filter pad 28' and a lower opening 48 defining a position in which the sealing ring accommodates a filter paper 28". The hinge members 34" and associated openings 46, 48 may be configured so that a positive seal is formed when either a filter pad or filter paper is used. This embodiment requires a user to move the sealing ring 32 between the upper and lower positions by inserting the pins 38 in the appropriate opening 46, 48. In another aspect of this embodiment, referring to FIG. 8, the pins could be dimensioned so that opposing sides thereof are removed to provide a thickness in one orientation wherein pin 38' would slide between the narrowed gap between upper opening 46 and lower opening 48. Accordingly, the user could then position the pins 38' within openings 46 or 48 without removing the pins 38' from the openings. It should be understood that a number of different openings corresponding to different positions may be provided and further that the openings need not be interconnected.

Figure 7:
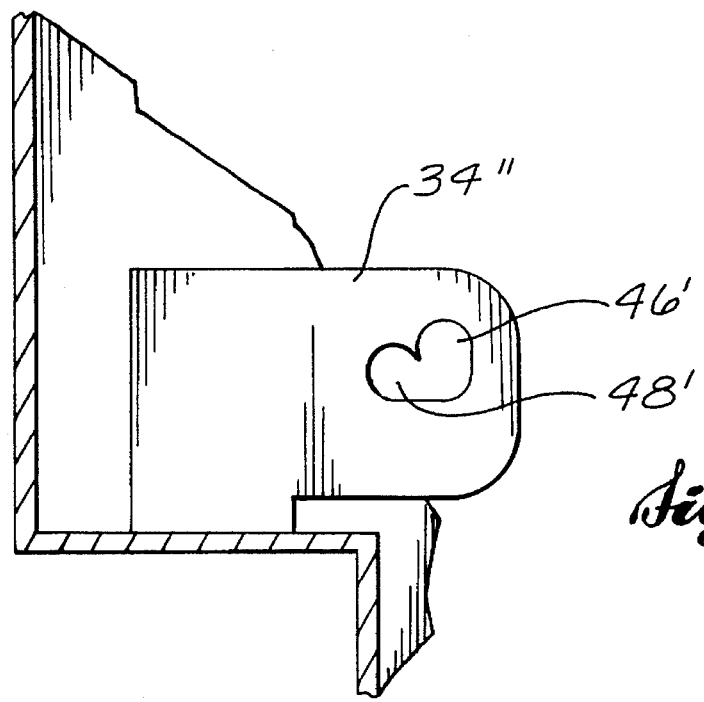
FIG. 7 is a side view of another alternative embodiment of the hinge member.

FIG. 7 shows another alternative embodiment in which a user must adjust the position of the sealing ring 32 when switching between filter pads and filter paper. In this embodiment, the user need not remove the pins 38 from the hinge members 34" when changing the position of the sealing ring 32. Rather, the hinge member 34" are each provided with an opening 46 shaped so as to allow a user to slide the sealing ring pins 38 between raised and lowered positions defined by upper opening 46' and lower opening 48' without removing the pins 38 from the hinge members 34". In this embodiment, in order to maintain sealing ring 32 in alignment with the filter support surface, it is preferable to provide means for displacing openings 46 or 48 in a plane parallel to filter support surface 22. Such means could include an adjustable extension of hinge member 34 or an adjustable extension on arm 36.

Furthermore, a biasing member, e.g., a spring, may be configured so as to urge the sealing ring 32 downwardly against the filter 28 in order that a positive seal is formed in every instance. For example, a compression spring may be configured on each of the hinge members so as to urge the corresponding pins and associated arms downwardly.

Figure 9:
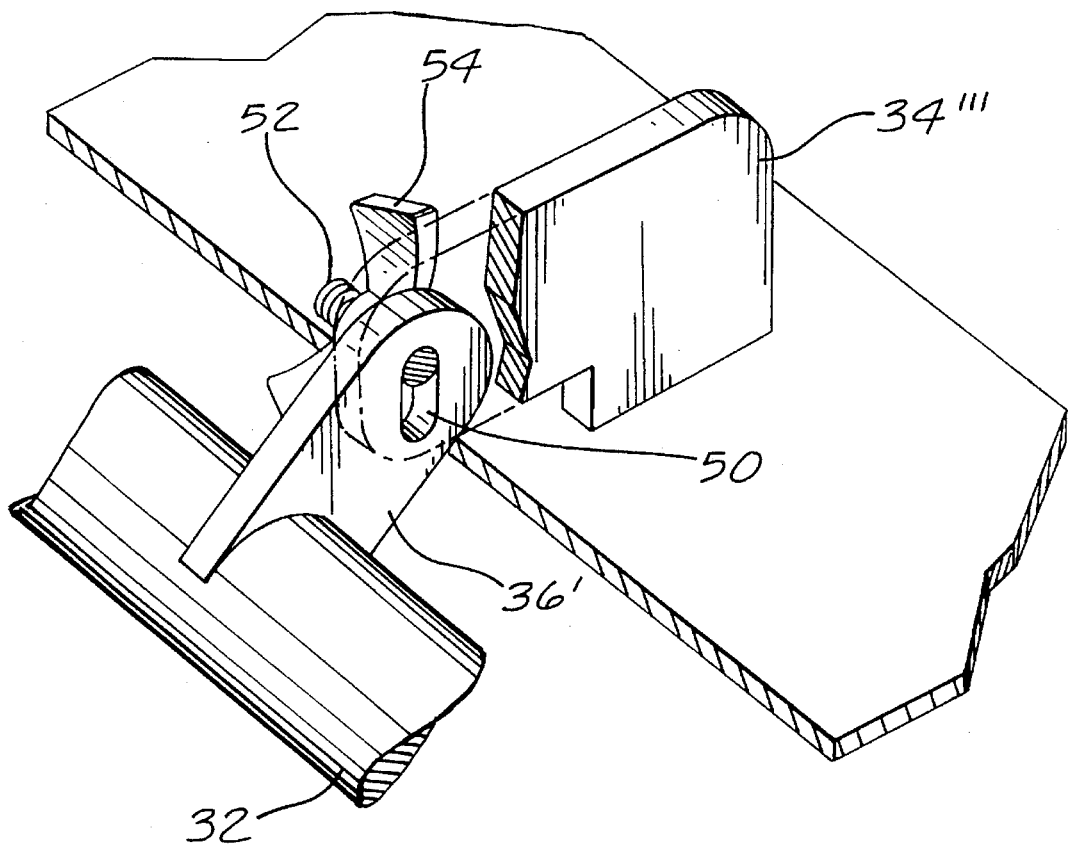
FIG. 9 is a perspective view of an alternative embodiment of the engagement of the hinge member and sealing ring arm.

While the preferred embodiments of the invention have been illustrated and described, it will be appreciated that various changes can be made therein without departing from the spirit and scope of the invention. For example, the sealing ring may be configured for vertical movement in a variety of ways. As one example, referring to FIG. 9, rather than providing slots in the hinge members as discussed above, slots 50 may be provided in the arms 36' on the sealing ring 32 and a horizontal pin 52 having a threaded end may be provided on each hinge member so that a vertical position may be designated by engaging the pin 52 on each hinge member 34''' in the slot on the corresponding arm 36' and tightening a nut 54 on the end thereof. Accordingly, it is to be understood that the invention is not to be limited to the specific embodiments illustrated and described.

The embodiments of the invention in which an exclusive property or privilege is claimed are defined as follows:

1. An adjustable filter holder assembly for use with a filtering pan to filter a contaminated fluid, the filter holder assembly comprising:

a filter support member having a filter contact surface; and sealing means for compressing a filter against the filter contact surface of the filter support member, the sealing means being adjustable between at least a first position in which the sealing means accommodates a filter pad and a second position in which the sealing means accommodates a filter paper, the filter paper having a thickness of no more than 1/16 of an inch, the sealing means forming a positive seal at least when the sealing means is in the first position.

2. The filter holder assembly of claim 1 wherein the sealing means comprises a sealing ring having a filter contact surface, the filter contact surface of the sealing ring and the filter contact surface of the filter support member defining the upper and lower bounds of a compartment for receipt of a filter, the sealing ring being movable between at least an upper position in which the compartment accommodates said filter pad and a lower position in which the compartment accommodates said filter paper.

3. The filter holder assembly of claim 2 wherein the sealing means further comprises biasing means for urging the sealing ring against the filter.

4. The filter holder assembly of claim 2 wherein the sealing means further comprises at least one hinge member located by the filter support member, an opening being formed in the hinge member, and at least one arm extending from the sealing ring, an engaging member extending horizontally from the arm, wherein the sealing ring is attached in the filter holder assembly by inserting the engaging member on the arm in the opening in the hinge member.

5. The filter holder assembly of claim 4 whereto the opening comprises a vertical slot.

6. The filter holder assembly of claim 4 wherein the opening comprises at least two interconnected substantially circular holes.

7. The filter holder assembly of claim 4 wherein the sealing means further comprises a latch means for urging the sealing ring against the filter.

8. The filter holder assembly of claim 2 wherein the sealing means further comprises at least one hinge member located by the filter support member, an engaging member extending horizontally from the hinge member, and at least one arm extending from the sealing ring, an opening being formed in the arm, wherein the sealing ring is attached in the filter holder assembly by inserting and securing the engaging member on the hinge member in the opening in the arm.

9. The filter holder assembly of claim 8 wherein the opening comprises a slot and the engaging member comprises a threaded pin, the pin being secured within the slot by a nut.

10. An adjustable filter holder assembly for use with an oil filtering pan to filter a contaminated oil, the filter holder assembly comprising:

support means for supporting a substantially planar filter, the support means including a filter contact surface;

adjustable compression means for compressing the filter against the filter contact surface to form a seal, the compression means being adjustable between at least a first position in which the compression means accommodates a filter pad and a second position in which the compression means accommodates a filter paper, the filter paper having a thickness of no more than 1/16 of an inch, the compression means forming a positive seal at least when the compression means accommodates a filter pad.

11. An oil filtering pan to filter a contaminated oil, the oil filtering pan comprising:

a receptacle for holding oil to be filtered, the receptacle having an opening at the bottom thereof for passage of filtered oil and a filtered support surface situated above the opening, wherein when a filter is placed in the receptacle, the filter is seated on the filter support surface;

a sealing ring which is oriented substantially horizontally when in a sealing position, the sealing ring having a filter contact surface, the filter support surface of the receptacle and the filter contact surface of the sealing ring defining the upper and lower bonds of a compartment for receipt of a filter when the sealing ring is in the sealing position, wherein when the distance between the filter-support surface of the receptacle and the filter contact surface of the sealing ring is at the upper bond, a positive seal is formed around the filter; and adjusting means for changing the vertical position of the filter contact surface of the sealing ring with respect to the filter support surface of the receptacle to accommodate filters of different thicknesses, including filter pads and filter paper the filter paper having a thickness of no more than 1/16 of an inch.

12. The oil filtering pan of claim 11, wherein the adjusting means comprises:

at least one vertically extending hinge member located by the filter support surface, the hinge member having an opening formed therein;

a pin operatively connected to the sealing ring, the pin engaging the opening in the hinge member and being movable within the opening so as to move the sealing ring between a first sealing position in which the filtering pan accommodates a filter pad and a second sealing position in which the filtering pan accommodates a filter paper.

13. The oil filtering pan of claim 11 further comprising a latch means for urging the sealing ring against the filter.

14. The oil filtering pan of claim 11 wherein the adjusting means comprises biasing means for urging the sealing ring against the filter.

* * * * *